July 1, 1947.  W. J. POTTS ET AL  2,423,253
LUGGAGE FASTENER
Filed Nov. 27, 1945
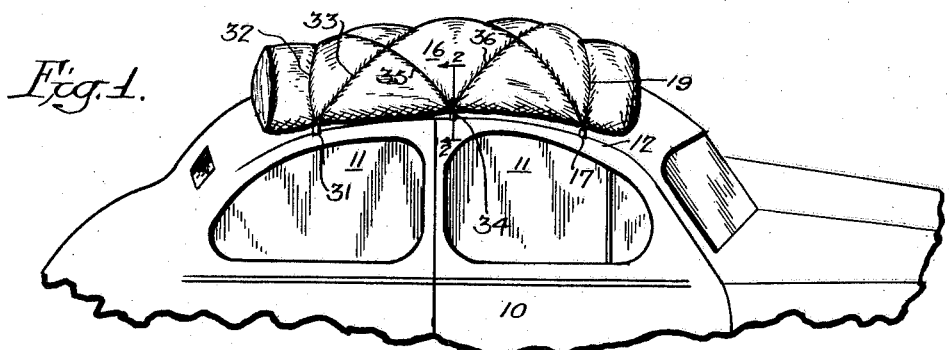
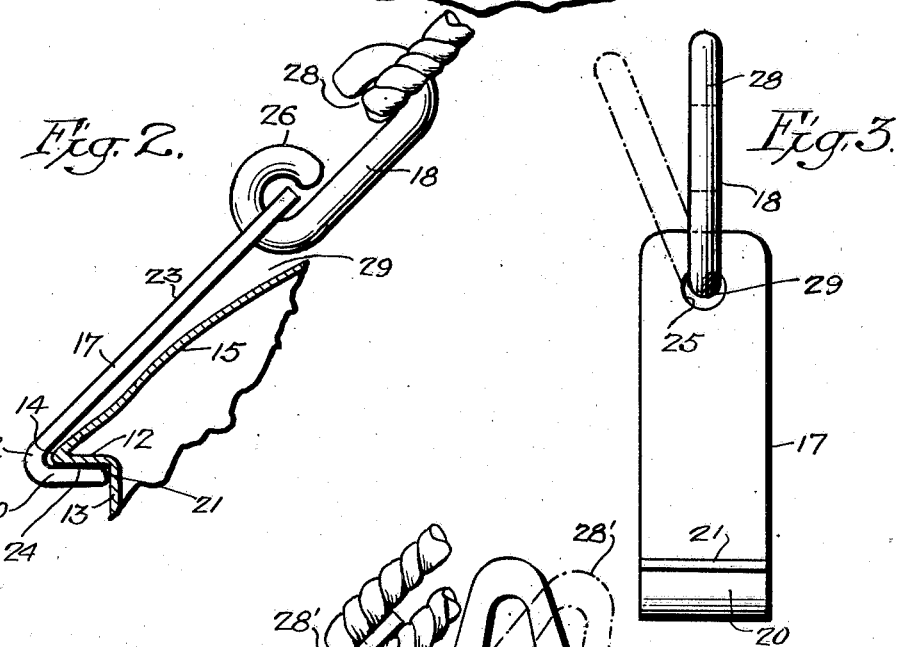
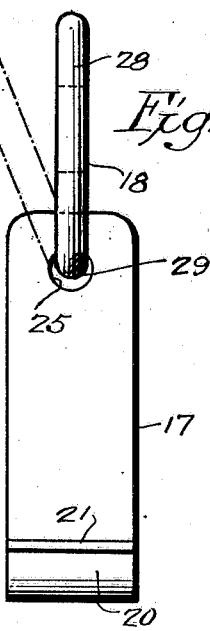
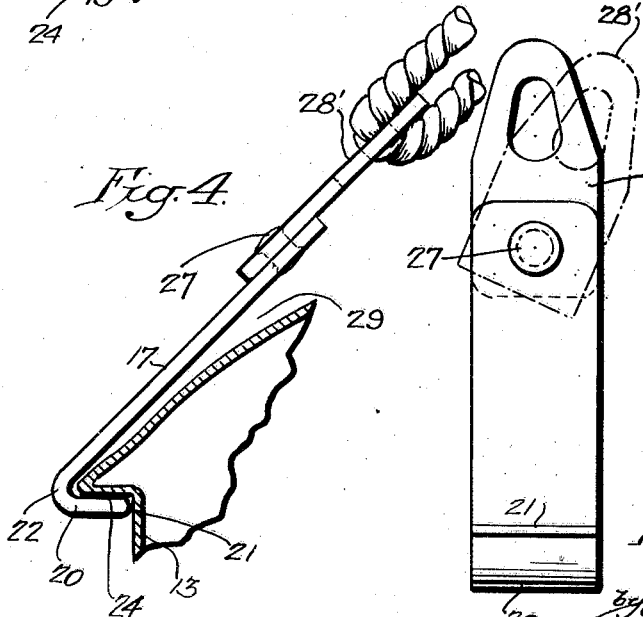
Inventors.
Walter J. Potts.
Howard S. Dalrymple
Attorneys.

Patented July 1, 1947

2,423,253

UNITED STATES PATENT OFFICE 2,423,253

LUGGAGE FASTENER

Walter J. Potts, Collingswood, and Howard S. Dalrymple, Woodlynne, N. J.

Application November 27, 1945, Serial No. 631,089

4 Claims. (Cl. 224—29)

My invention relates to an automobile luggage fastener of the type which fastens articles placed on the roof of the car.

The purpose of my invention is to avoid contact with the roof of the car by the luggage fastener, limiting the contact to the under portion of the ledge at the edges of the roof, so as to prevent marring of visible portions of the automobile structure.

A further purpose is to employ hooks under the ledge which are of adequate length to seat fully, preventing contact between the hooks and the extreme outside edges of the roof.

A further purpose is to provide an engagement between the hooks under the ledges and the ledges, over the full width of the ledges so as to obtain maximum frictional engagement against slipping of the hooks.

A further purpose is to employ links swingably connected to the shanks of the hooks to facilitate tying of rope to hold the articles on the roof and to permit readjustment of the angular relationship without unseating the hooks.

A further purpose is to extend the shanks of the hooks adequately in length, so that the links will not engage the roof or cause angular shifting of the hooks, thus preventing marring of the roof or unseating of the hooks.

Further purposes appear in the specification and in the claims.

In the drawings we have chosen to illustrate a few only of the variations in which our invention may appear which is shown from the standpoint of improvement we are illustrating of the principles involved and of satisfactory operation.

Figure 1 is a fragmentary perspective view showing a device of the invention in place on the roof of an automobile.

Figure 2 is a section of Figure 1 on the line 2—2 in enlarged scale.

Figure 3 is a side elevation of the device of the invention.

Figure 4 is a section corresponding to Figure 2, but showing a modification.

Figure 5 illustrates, in side elevation, the hook device of the type shown in Figure 4.

Describing in illustration but not in limitation and referring to the drawing:

In prior art luggage fasteners for use on the roof of automobiles, it has commonly been necessary to employ cumbersome fastening means frequently engaging the automobile at points which will later show evidence of scratching or marring after the device has been removed.

The device of the present invention will hold any one of the normally carried luggage or household articles in position on the roof of an automobile without necessitating contact by the luggage fastener with the roof at any point normally visible. In fact, in accordance with the invention the contact can be limited entirely to the under surface of the roof ledge where a minor amount of abrasion can be permitted without detracting from the appearance of the automobile.

In the prior art difficulty has also been caused because the fasteners have extended high above the roof, providing considerable leverage when the car swings laterally and making it difficult to secure the load against vibration of the car. By the device of the invention it is possible to hold luggage and furniture on the roof, not only during the vibration of normal travel but also in actual experiment it has been found possible to retain such articles in position when the automobile was thrown off the road, due to a mishap.

The automobile 10 has above its windows 11 the usual ledge 12, sometimes described as a gutter or sill. The ledge includes a wall portion 13 beneath the ledge which is substantially vertical and an outer edge 14 where the roof 15 terminates.

Resting on the roof we provide articles 16 to be carried, arranged in any suitable shape, and wrapped in a covering or padding in the preferred form.

The luggage fastener consists of hooks 17, links 18 and rope 19. The hooks are disposed in two sets; one spaced along each ledge, desirably one at the front and one near the center and one near the rear, as shown in Figure 1.

Each hook has a hook portion 20, which is desirably slightly longer than the width of the ledge so that when engagement of the end 21 of the hook portion against the vertical wall 13, it is impossible for the bend 22 of the hook and the shank 23 to touch the roof.

The hook portion 20 besides being long enough to engage at the base of the ledge should have a frictional engaging upper portion 24 which contacts the under portion of the ledge 12, during the major part of the length of the hook portion, so as to provide maximum friction against slipping of the hook laterally toward the front or rear along the sill.

The end of the shank 23 is provided with an opening 25 which receives the link 18. The link is permitted free swinging movement in the shank either by loose connection of a closed eye 26 in the opening 25 in the form of Figures 2 and 3, or by pivotal connection 27 in the form of Figures 4 and 5.

At the inner end of the link we provide an eye for the engagement of the rope through an open eye as shown at 28 in Figures 2 and 3, or a closed eye as shown at 28' in Figures 4 and 5.

The shank 23 as shown is of adequate length so that the lower portion of the link at 29 is entirely free from engagement with the roof. This has two important advantages, in the first place, preventing marring of the roof, and in the second place, preventing free adjustment of the eye to line up with the resultant forces applied by the rope. It has been found in practice that the use of a link between the rope attachment and the hook improves flexibility in the structure and prevents chafing of the hook in its seat under road shock.

It will be evident from Figure 1 that the hook at 31 at one end of the fastener, is connected to the set of hooks on the opposite sides by a section of rope 32 going straight across and a section of rope 33 extending diagonally, so that the angular pull on the link is not directly at right angles to the length of the sill, but tends to swing the link to a slight extent also extending the hook toward the direction of the diagonal section 33.

On the other hand a middle hook at 34 is secured by two diagonal sections of rope 35 and 36 so that its link maintains a position suspended at right angles with the sill. However, as the placement is never uniform and never equal the links readily adjust themselves to the contour and setting of the particular installation making it possible to install a standard fastener on many different shapes of automobile tops and to hold many different types of luggage.

In Figures 3 and 5 the range of possible angular positions of the links are shown by the dot and dash illustrations.

In operation a suitable pad or covering will be placed on the roof of the car and the luggage placed in it or wrapped up in it. The rope will be carried across the luggage and one hook fastened under the sill, being careful that the end of the hook engages the vertical wall 13 and that the shank of the hook and the link are out of contact with the roof. The rope is then attached to the link of the hook, if it has not previously been attached, and drawn across to its points of attachment at the other side, where at a desirable point another hook is positioned under the ledge and its hook engaged by the rope bringing the section of rope to proper tightness. This operation of criss-crossing is carried on applying the hooks at each end to a rope section, until finally the last hook has been applied. Thus as shown in Figure 1, each end hook will connect to one rope section going straight across and one rope section going to a middle hook on the opposite side, while each middle hook will connect to rope sections secured to the end hooks of the opposite side.

It will be evident, of course, that other tying connections may be developed to utilize the hooks of the present invention.

The freedom of movement between the link and shank of the hook will take care of any change in direction. In the preferred form of the invention the hook portion 20 is desirably at an angle of 45° with respect to the shank 23 so that when the hook portion is resting flat under the ledge, the shank 23 is extending upward at an angle of about 45° and inward. This angular relationship is desirable because with sufficient length of the shank it is sure of clearance of the link and roping with respect to the roof of the car.

Our invention is so simple the fastener can be very easily installed by anyone.

We intend to package this and sell as a unit the clips, rope and special package box along with instructions and specify that it can be carried in the glove compartment when not in use.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described our invention what we claim as new and desire to secure by Letters Patent is:

1. An automobile luggage fastener for use on the roof of an automobile consisting of two sets of hooks spaced along the respective edges of the roof of the car and engaging under the roof ledge, with their shanks extending diagonally upwards and towards the middle of the roof, links movably engaging on the ends of the shanks and having eye portions, the length of the shanks being sufficient to permit the links to clear the roof and to prevent displacement of the shanks by contact between the links and the roof, and the links being free to deflect angularly entirely out of contact with the roof, and ropes cross-connecting between the eyes of the links on respective hooks at opposite edges of the roof.

2. In an automobile package holder adapted to be used on the roof of an automobile, two sets of hooks positioned at intervals, having hook portions engaging under roof ledges of the automobile at the respective sides and having shank portions extending diagonally upward and inward, links making swinging connection with the ends of the shanks and having eyes, the shank length being sufficient to permit the links to clear the roof and to adjust their angular relationship freely entirely out of contact with the roof and a rope having two sections passing through the eyes of each link, at least one of which is diagonally opposite the hook links permitting lateral adjustment of the direction of holding, in line with the resilient forces of the rope sections.

3. A hook adjustment for fastening articles on the roof of an automobile comprising a hook having a hook portion and a shank at approximately 45° relationship, the hook portion being long enough to seat under the ledge of an automobile roof and being flat on its upper edge to provide maximum frictional engagement, a link having an eye portion attached to the end of the shank and free to move in angular relationship to the shank entirely out of contact with the roof, the shank length being sufficient to permit the link to clear the roof without loss in maximum engagement between the hook end and the ledge.

4. An automobile luggage fastener for holding articles on the roof of an automobile, comprising a plurality of hooks spaced along each edge of the roof having hook portions and shank portions, the hook portions fully seating under the ledges and engaging the ledges at the upper side of the hook portion for frictional connection against laterally slipping, links swingably connected to the ends of the shanks, and means for cross-connecting the eyes of the links of the respective sets over the articles being supported on the roof, the shanks of the hooks and the cross connections being entirely free from contact with the roof so that the only engagement of the fastener with the automobile is under the ledges.

WALTER J. POTTS.
HOWARD S. DALRYMPLE.

REFERENCES CITED

The following references are of record in the file of this patent:

UNITED STATES PATENTS

| Number | Name | Date |
| --- | --- | --- |
| 2,119,051 | Le Boeuf | May 31, 1938 |
| 2,109,571 | Le Boeuf | Mar. 1, 1938 |
| 2,387,779 | Strauss | Oct. 30, 1945 |
| 1,798,872 | Ellis | Mar. 31, 1931 |
| 2,357,203 | Jimmes | Aug. 29, 1944 |

FOREIGN PATENTS

| Number | Country | Date |
| --- | --- | --- |
| 93,664 | Sweden | Dec. 7, 1938 |